(12) United States Patent
Yu et al.

(10) Patent No.: US 12,224,449 B2
(45) Date of Patent: Feb. 11, 2025

(54) CASE, SECONDARY BATTERY, BATTERY PACK, VEHICLE, AND METHOD FOR MANUFACTURING SECONDARY BATTERY

(71) Applicant: CONTEMPORARY AMPEREX TECHNOLOGY (HONG KONG) LIMITED, Hong Kong (CN)

(72) Inventors: Jingjing Yu, Ningde (CN); Jie Du, Ningde (CN); Zhiming Chen, Ningde (CN); Ruiqi Han, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 150 days.

(21) Appl. No.: 17/563,077

(22) Filed: Dec. 28, 2021

(65) Prior Publication Data

US 2022/0123406 A1     Apr. 21, 2022

Related U.S. Application Data

(63) Continuation of application No. PCT/CN2020/105558, filed on Jul. 29, 2020.

(30) Foreign Application Priority Data

Sep. 19, 2019   (CN) ........................ 201910884725.4

(51) Int. Cl.
    *H01M 50/209*     (2021.01)
    *H01M 50/124*     (2021.01)
    *H01M 50/271*     (2021.01)

(52) U.S. Cl.
    CPC ..... *H01M 50/209* (2021.01); *H01M 50/1245* (2021.01); *H01M 50/271* (2021.01); *H01M 2220/20* (2013.01)

(58) Field of Classification Search
    CPC .................. H01M 50/1245; H01M 50/209
    See application file for complete search history.

(56) References Cited

U.S. PATENT DOCUMENTS

| | | | |
|---|---|---|---|
| 7,175,936 B2 * | 2/2007 | Kawamura | ......... H01M 50/152 |
| | | | 429/211 |
| 2003/0008088 A1 * | 1/2003 | Matsubara | .......... H01M 50/121 |
| | | | 428/35.7 |

(Continued)

FOREIGN PATENT DOCUMENTS

| | | |
|---|---|---|
| CN | 1783534 A | 6/2006 |
| CN | 102732137 A | 10/2012 |

(Continued)

OTHER PUBLICATIONS

English language translation of WU (CN 106883724 A). (Year: 2017).*

(Continued)

*Primary Examiner* — Jonathan G Jelsma
(74) *Attorney, Agent, or Firm* — East IP P.C.

(57) ABSTRACT

Embodiments of the present application provide a case, a secondary battery, a battery pack, a vehicle, and a method for manufacturing a secondary battery. The case includes a bottom wall and a side wall, the bottom wall and the side wall defining an accommodating cavity with an opening at one end for accommodating an electrode assembly of the secondary battery; wherein, an outer surface of the side wall includes a coated region coated with an insulating coating, and the coated region extends, in a height direction of the side wall, from a side of the side wall that is close to the bottom wall to a position near an edge of a side of the side wall that is close to the opening, so as to reserve a non-coated region with a preset height on the outer surface of the side wall that is near an edge of the opening.

20 Claims, 5 Drawing Sheets

(56) References Cited

U.S. PATENT DOCUMENTS

| | | | |
|---|---|---|---|
| 2009/0092897 A1 | 4/2009 | Lee | |
| 2014/0205895 A1* | 7/2014 | Kim | H01M 50/1245 429/163 |
| 2014/0329138 A1 | 11/2014 | Park et al. | |
| 2018/0358592 A1* | 12/2018 | Park | C08K 5/49 |

FOREIGN PATENT DOCUMENTS

| | | | | |
|---|---|---|---|---|
| CN | 103050731 A | 4/2013 | | |
| CN | 103999255 A | 8/2014 | | |
| CN | 104103777 A | 10/2014 | | |
| CN | 105428691 A | 3/2016 | | |
| CN | 106883724 A | 6/2017 | | |
| CN | 107134547 A | * | 9/2017 | H01M 10/0525 |
| CN | 107925022 A | 4/2018 | | |
| CN | 209104235 U | 7/2019 | | |
| DE | 102017216673 A1 | 3/2019 | | |
| JP | 2003223871 A | 8/2003 | | |
| JP | 2015049942 A | 3/2015 | | |
| JP | 2015507327 A | 3/2015 | | |
| JP | 2015508564 A | 3/2015 | | |
| KR | 20090077123 A | 7/2009 | | |
| WO | 2016075736 A1 | 5/2016 | | |
| WO | WO-2018008767 A1 * | 1/2018 | | H01G 11/78 |

OTHER PUBLICATIONS

English language machine translation of JP2015-049942 A. (Year: 2015).*
The International search report for PCT Application No. PCT/CN2020/105558, dated Oct. 30, 2020, 11 pages.
The First Office Action for Chinese Application No. 201910884725.4, dated May 28, 2021, 21 pages.
The Second Office Action for Chinese Application No. 201910884725.4, dated Sep. 16, 2021, 18 pages.
The Rejection Decision for Chinese Application No. 201910884725.4, dated Nov. 25, 2021, 6 pages.
The extended European search report for European Application No. 20865575.3, dated Jun. 2, 2022, 8 pages.
The Notice of Reexam for Chinese Application No. 201910884725.4, dated May 26, 2022, 8 pages.
The Reexam Decision for Chinese Application No. 201910884725.4, dated Aug. 23, 2022, 12 pages.
The First Office Action for JP Application No. 2021-553389, dated Nov. 1, 2022, 13 pages.
The First Office Action for Chinese Application No. 202211363111.X, dated Apr. 13, 2024, 12 pages.

* cited by examiner

CASE, SECONDARY BATTERY, BATTERY PACK, VEHICLE, AND METHOD FOR MANUFACTURING SECONDARY BATTERY

CROSS-REFERENCE TO RELATED APPLICATION

This application is a continuation of International Application No. PCT/CN2020/105558, filed on Jul. 29, 2020, which claims priority to Chinese Patent Application No. 201910884725.4 entitled "Case, Secondary Battery, Battery Pack, Vehicle, and Method for Manufacturing Secondary Battery" and filed on Sep. 19, 2019, both of which are incorporated herein by reference in their entireties.

TECHNICAL FIELD

This application relates to the technical field of energy storage devices, and in particular, to a case, a secondary battery, a battery pack, a vehicle, and a method for manufacturing a secondary battery.

BACKGROUND

With the rapid development of consumer electronics and electric vehicles, the lithium-ion electronics industry has attracted widespread attention from all walks of life. The requirements for batteries are increasingly strict. As the core part of new energy vehicles, lithium-ion batteries are strictly required to have safety, reliability and stability.

A lithium-ion battery is composed of an electrode assembly and a metal case accommodating the electrode assembly. The case is usually an aluminum case. After the electrode assembly is assembled into the case, a cover plate is welded to the case by laser to realize the structural connection and sealing of the battery. Lithium-ion batteries need to be insulated during use to achieve the safety and reliability of battery module and battery pack. At present, the insulation requirements for lithium-ion batteries are generally implemented in the process of assembling batteries into a battery module or battery pack by sticking an insulating film to the surface. However, the insulating film is easily scratched or damaged by external substances, hard particles, etc. during production or operation, resulting in insulation failure to affect the safety performance of batteries.

Therefore, a new case, secondary battery, battery pack, vehicle, and method for manufacturing a secondary battery are urgently needed.

SUMMARY

The present application provides a case, a secondary battery, a battery pack, a vehicle, and a method for manufacturing a secondary battery, aiming to improve the safety performance of the secondary battery.

The first aspect of the present application provides a case for a secondary battery, the case including a bottom wall and a side wall, the bottom wall and the side wall defining an accommodating cavity with an opening at one end for accommodating an electrode assembly of the secondary battery; wherein, an outer surface of the side wall includes a coated region coated with an insulating coating, and the coated region extends, in a height direction of the side wall, from a side of the side wall that is close to the bottom wall to a position near an edge of a side of the side wall that is close to the opening, so as to reserve a non-coated region with a preset height on the outer surface of the side wall that is near an edge of the opening.

Optionally, the coated region has an area of from 70% to 85%, relative to a total area of the outer surface of the side wall; and/or, the coated region has an extension height of from 70% to 85% in the height direction, relative to a total height of the side wall.

Optionally, the non-coated region has an extension height of greater than or equal to 3 mm in the height direction.

Optionally, the insulating coating includes: relative to a total weight of the insulating coating, 80-97 wt % of insulating film-forming resin, 3-12 wt % of auxiliary agent, and 0-8 wt % of pigment.

Optionally, the pigment is selected from a toner; and/or, the insulating film-forming resin is selected from epoxy resin, polyurethane, acrylic resin, phenolic resin, polyester resin, and combinations thereof; and/or, the auxiliary agent is selected from at least one of a light stabilizer, a heat stabilizer, an antioxidant, a defoamer, a leveling agent, a flame retardant, and a plasticizer.

Optionally, the insulating film-forming resin is obtained by photo-curing an acrylic functionalized prepolymer and an acrylic monomer in the presence of a photoinitiator, wherein the acrylic functionalized prepolymer is selected from at least one of a polyester acrylate prepolymer, epoxy acrylate prepolymer, urethane acrylate prepolymer and pure acrylate prepolymer, and the acrylic monomer is selected from at least one of monoalkyl acrylate, diol diacrylate and triol triacrylate; or, the insulating film-forming resin is obtained by curing reaction of epoxy resin, polyurethane, polyester or acrylic resin with a curing agent.

Optionally, the insulating coating has a thickness of from 80 μm to 160 μm.

The second aspect of the present application provides a secondary battery, including: the above-mentioned case; an electrode assembly placed in the accommodating cavity; a cover plate covering the opening; and an insulating film covering at least the non-coated region.

Optionally, the insulating film includes a bonding segment and a stacking segment successively arranged in the height direction, the bonding segment is bonded to the non-coated region, and the stacking segment extends from the bonding segment to an outer surface of the insulating coating.

Optionally, the stacking segment has an extension height of from 1.5 mm to 6 mm in the height direction.

The third aspect of the present application provides a battery pack, including: a box; and the above-mentioned secondary batteries, the secondary batteries being accommodated in the box.

Optionally, the secondary batteries are adhered to an inner wall surface of the box by an adhesive.

The fourth aspect of the present application provides a vehicle, including the above-mentioned battery pack.

The fifth aspect of the present application further provides a method for manufacturing a secondary battery, including:
  providing the above-mentioned case;
  placing an electrode assembly into the accommodating cavity from the opening;
  covering the opening by a cover plate, and welding the cover plate and the side wall to each other; and
  bonding an insulating film to the outside of the side wall, the insulating film covering at least the non-coated region.

In the case according to the present application, the case includes a bottom wall, a side wall, and a coated region and a non-coated region on an outer surface of the side wall, and the coated region is coated with an insulating coating. The bottom wall and the side wall enclose an accommodating cavity with an opening, and an electrode assembly of a secondary battery can be placed into the accommodating cavity from the opening. The coated region extends, in a height direction, from the side of the side wall that is close to the bottom wall to a position near the side of the side wall that is close to the opening, so as to reserve the non-coated region on the outer surface near the edge of the opening. As such, when a cover plate of the secondary battery is welded to the case at the opening, the high temperature caused by welding will not affect the stability of the insulating coating on the coated region. The outer surface of the side wall is coated with the insulating coating, and the adhesive force between the insulating coating and the side wall is relatively large, which can ensure the flatness and good insulation performance of the outer surface of the side wall. Therefore, during the production and use of the case, the insulating coating can be well bonded to the coated region for a long term, achieving better long-term safety and reliability of the case.

DESCRIPTION OF THE DRAWINGS

The features, advantages, and technical effects of exemplary embodiments of the present application will be described below with reference to the accompanying drawings, and the accompanying drawings are not drawn according to actual scale.

REFERENCE NUMERALS 10, case; 100, bottom wall; 200, side wall; 210, insulating coating; 220, second insulating film; 221, bonding segment; 222, stacking segment; 300, opening; 400, accommodating cavity; 500, cover plate; 510, first insulating film; 520, electrode terminal; Z, height direction.

DETAILED DESCRIPTION

The features and exemplary embodiments of various aspects of the present application will be described in detail below. In the following detailed description, many specific details are given in order to provide a comprehensive understanding of the present application. However, it will be obvious to those skilled in the art that the present application may be implemented without some of these specific details. The following description of the embodiments is only to provide a better understanding of the present application by showing examples of the present application. In the drawings and the following description, at least part of the well-known structures and technologies are not shown in order to avoid unnecessary blurring of the present application; and, for clarity, the sizes of some structures may be exaggerated. Furthermore, the features, structures or characteristics described hereinafter may be combined in any suitable manner in one or more embodiments.

In the description of the present application, it should be noted that, unless otherwise specified, "plurality of" means two or more; the orientations or positional relationships indicated by the terms "upper", "lower", "left", "right", "inner", "outer", etc. are only for facilitating description of the present application and simplifying the description, but do not indicate or imply that the pointed apparatuses or elements must have specific orientations or be constructed and operated in specific orientations. Therefore, the terms should not be understood to limit the present application.

The orientation terms appearing in the following description all indicate directions shown in the drawings, and are not intended to limit the specific structures of the embodiments of the present application. In the description of the present application, it should also be noted that, unless otherwise clearly specified and defined, the terms "mounted" and "connected" should be understood broadly; for example, the term "connected" may refer to two components that are fixedly connected, detachably connected, integrally connected, directly connected, or indirectly connected. Those of ordinary skill in the art could understand the specific meanings of the above terms in the present application depending on specific circumstances.

In order to better understand the present application, the case, secondary battery, battery pack, vehicle, and method for manufacturing a secondary battery according to the embodiments of the present application will be described in detail below in conjunction with FIGS. 1 to 8.

The present application first provides a vehicle, which is provided with a battery pack. The battery pack includes a box and a secondary battery accommodated in the box.

Figure 1:
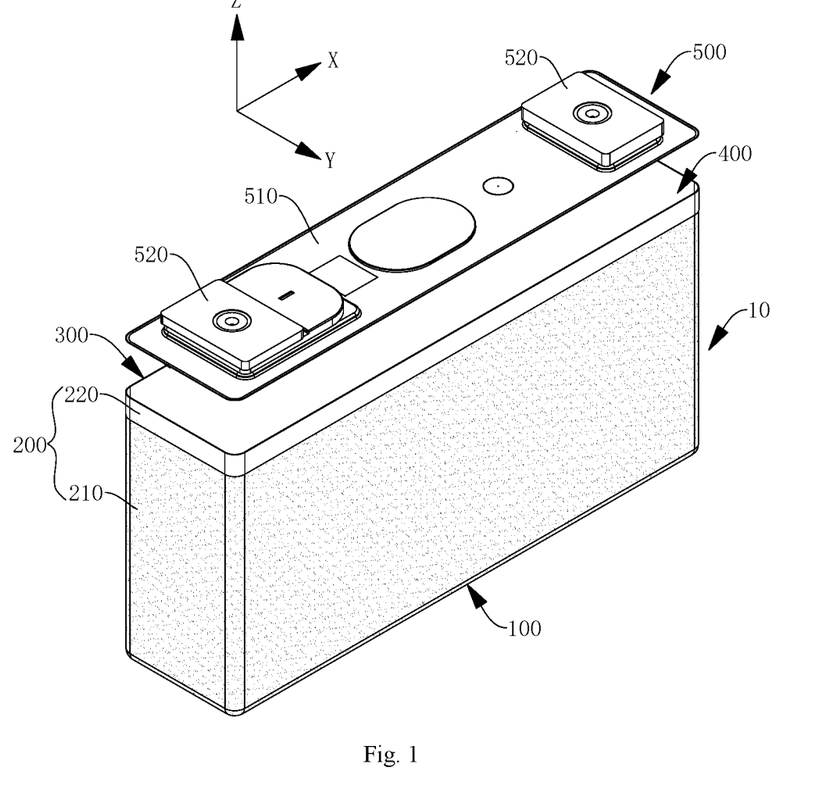
FIG. 1 is a schematic structural diagram of a secondary battery according to an embodiment of the first aspect of the present application.

FIG. 1 is a schematic structural diagram of a secondary battery according to an embodiment of the application. The secondary battery includes: a case 10 including a bottom wall 100 and a side wall 200, the bottom wall 100 and the side wall 200 defining an accommodating cavity 400 with an opening 300 at one end; an electrode assembly (not shown in the figure) located in the accommodating cavity 400, the electrode assembly being formed by winding a positive electrode plate, a negative electrode plate and a separator, or by stacking a positive electrode plate, a negative electrode plate and a separator, the accommodating cavity 400 being filled with an electrolyte; and a cover plate 500 covering the opening 300 in a sealing manner.

The case 10 and the cover plate 500 may be connected in various ways. Optionally, the case 10 and the cover plate 500 are connected to each other by welding to ensure the stability of a relative position and the reliability of connection and sealing between the case 10 and the cover plate 500.

In some embodiments, the case 10 of the secondary battery is made of a metal material, such as aluminum or steel. In order to prevent electrochemical corrosion of the metal case 10, the metal case 10 is positively charged under normal circumstances. When the secondary battery is assembled into a battery module or a battery pack, metal particles may fall onto the secondary battery to electrically connect the case 10 of the secondary battery with a negative electrode, causing an external short circuit of the secondary battery to affect the safety performance of the secondary battery. Therefore, insulation protection is required for the secondary battery.

In some embodiments, an outer surface of the cover plate 500 away from the accommodating cavity 400 is provided with a first insulating film 510. The arrangement of the first insulating film 510 is not limited. For example, the cover plate 500 is further provided with protruding structures such as electrode terminals 520. The electrode terminals 520 may include a positive electrode terminal and a negative electrode terminal. The first insulating film 510 is provided with through holes from which the electrode terminals 520 extend out. Gaps are prevented between the first insulating film 510 and the cover plate 500 due to the protruding structures, the contact area between the cover plate 500 and the first insulating film 510 is increased, and the stability of a relative position and the reliability of connection between the cover plate 500 and the first insulating film 510 are thus improved.

The first insulating film 510 may be configured in various ways. For example, the first insulating film 510 includes one or more of polyethylene terephthalate, polyimide, polycarbonate, polyethylene, polyvinylidene fluoride, and polytetrafluoroethylene.

In order to ensure the insulation performance of the case 10 of the secondary battery, the case 10 may be configured in various ways. For example, the case 10 may be covered with an insulating film.

In other embodiments, an outer surface of the side wall 200 includes a coated region coated with an insulating coating 210, and the coated region extends, in a height direction (Z direction in FIG. 1) of the side wall 200, from the side of the side wall 200 that is close to the bottom wall 100 to a position near an edge of the side of the side wall 200 that is close to the opening 300, so as to reserve a non-coated region with a preset height on the outer surface of the side wall 200 that is near the edge of the opening 300. The coated region does not extend to the edge of the opening 300 in the height direction, the insulating coating 200 does not completely cover the outer surface of the side wall 200, and the coated region is close to the edge of the opening 300 in the height direction but separated from the edge of the opening 300 by a predetermined distance, defining the non-coated region on the outer surface of the side wall 200, which is not covered by the insulating coating 210. That is, the outer surface of the side wall 200 includes a coated region and a non-coated region successively arranged in the height direction, the coated region is closer to the bottom wall 100 than the non-coated region, and the non-coated region is closer to the opening 300 than the coated region. The outer surface of the side wall 200 refers to the surface of the side wall 200 away from the accommodating cavity 400. In some embodiments, the side of the side wall 200 that is close to the bottom wall 100 is specifically a junction between the side wall 200 and the bottom wall 100.

The insulating coating 210 may be configured in various ways, and the insulating coating 210 is usually formed by applying an organic coating to the coated region. The coating is sensitive to temperature. If the ambient temperature of the insulating coating 210 is too high and higher than the melting point of the coating, the insulating coating 210 is likely to melt, which will affect the stability and insulation protection performance of the insulating coating 210.

In the case 10 of the embodiment of the present application, the coated region extends, in the height direction, from the side of the side wall 200 that is close to the bottom wall 100 to a position near the side of the side wall 200 that is close to the opening 300, so as to reserve the non-coated region on the outer surface of the side wall 200 that is near the edge of the opening 300. As such, when the cover plate 500 of the secondary battery is welded to the case 10 at the opening 300, the high temperature caused by welding will not affect the stability of the insulating coating 210 on the coated region. The outer surface of the side wall 200 is coated with an insulating coating 210, the adhesion of the insulating coating 210 is relatively strong, and the adhesive force between the insulating coating 210 and the side wall 200 is relatively large, which can ensure the flatness of the outer surface of the side wall 200 and good insulation performance. Therefore, during the production and use of the case 10, the insulating coating 210 can be well bonded to the coated region for a long term, achieving a better long-term safety and reliability of the case 10.

Further, in other embodiments, the outer surface of the bottom wall 100 away from the accommodating cavity 400 is also coated with the insulating coating 210. As such, when the secondary battery is disposed in the box of the battery pack, the insulation performance between the bottom wall 100 of the secondary battery and a bottom plate of the box can be ensured. Further, the insulating coating 210 coated on the outer surface of the side wall 200 and the insulating coating 210 coated on the outer surface of the bottom wall 100 are configured integrally.

When the outer surface of the case 10 of the secondary battery is coated with the insulating coating 210, the secondary battery is adhered to an inner wall surface of the box by an adhesive. Since the outer surface of the case 10 is provided with the insulating coating 210, the relative position between the insulating coating 210 and the bottom wall 100 or the side wall 200 is more stable. When the secondary battery is adhered to the inner wall surface of the box, the stability of the relative position between the secondary battery and the case will not be affected due to the relative movement of the insulating coating 210 with respect to the case 10.

The inner wall surface of the box is not limited. In some embodiments, the box includes a bottom plate, a plurality of side plates connected to a peripheral side of the bottom plate, an accommodating space enclosed by the bottom plate and the plurality of side plates, a box opening communicated with the accommodating space, and an upper cover covering the box opening, the upper cover and the bottom plate being disposed oppositely in the height direction of the box. The inner wall surface of the box may be the surface of the bottom plate facing the accommodating space, or the surface of the side plates or the upper cover facing the accommodating space.

Optionally, the inner wall surface of the box is the surface of the bottom plate facing the accommodating space, and the secondary battery is adhered to the bottom plate by an adhesive, so that the secondary battery is fixed to the bottom plate of the box.

The area and shape of the coated region are not limited here. In order to ensure good insulation performance on the outer surface of the case 10 and good adhesion between the insulating coating 210 and the case 10, the coated region has an area of from 70% to 85%, relative to a total area of the outer surface of the side wall 200. Further, the coated region has an area of 80%, relative to a total area of the outer surface of the side wall 200.

The case 10 is usually prismatic or cylindrical. In order to ensure good adhesion between the insulating coating 210 and the case 10, an extension height h of the coated region in the height direction and a total height H of the side wall 200 should satisfy the following relation:

$$\frac{h}{H} = (70\% - 85\%) \quad (1)$$

That is, the coated region has an extension height of from 70% to 85% in the height direction, relative to a total height of the side wall 200. It can also ensure that the insulating coating 210 occupies a large area on the outer surface of the side wall 200, and ensure good adhesion performance between the insulating coating 210 and the side wall 200.

In other embodiments, in order to ensure that the insulating coating 210 is not affected during the welding of the cover plate 500 and the case 10, the extension height m of the non-coated region in the height direction is greater than or equal to 3 mm. When the cover plate 500 is welded to the opening 300 of the case 10, the high temperature region caused by welding is limited. The height m of the non-coated region near the opening 300 is greater than or equal to 3 mm, which can effectively ensure that the high temperature produced during the welding will not be spread to the coated region to affect the stability of the insulating coating 210.

In some embodiments, the edge of the coated region that is close to the opening 300 and the edge of the side wall 200 that is close to the opening 300 are disposed in parallel. As such, the non-coated region has the same height at different positions in the circumferential direction of the case 10, and the stability of the insulating coating 210 will not be affected on the circumferential side of the opening 300 during the welding of the cover plate 500 and the case 10.

In order to ensure good insulation performance, the insulating coating 210 needs to have a certain thickness. In some embodiments, the insulating coating 210 has a thickness of from 80 μm to 160 μm. Further, the insulating coating 210 has a thickness of from 100 μm to 140 μm. When the thickness of the insulating coating 210 is within said thickness range, it can not only ensure that the insulation performance of the insulating coating 210 meets the requirements, but also can prevent too large size of the case 10 due to excessive thickness of the insulating coating 210. The excessive thickness of the insulating coating 210 will also lead to waste of the coating for the insulating coating 210 and reduce the energy density of the secondary battery.

The thickness of the insulating coating 210 refers to a distance between the outer surface of the insulating coating 210 away from the accommodating cavity 400 and the outer surface of the side wall 200. There may be a certain variation in the thickness of the insulating coating 210 everywhere in the coated region. The thickness of the insulating coating 210 may be an average thickness of the insulating coating 210 everywhere in the coated region, or the thickness of the insulating coating 210 may be a minimum thickness of the insulating coating 210 everywhere in the coated region.

As described above, in order to improve the adhesion of the insulating coating 210, the insulating coating 210 is formed by applying an organic coating to the coated region. Optionally, the insulating coating 210 includes: relative to a total weight of the insulating coating, 80-97 wt % of insulating film-forming resin, 3-12 wt % of auxiliary agent, and 0-8 wt % of pigment.

Optionally, the insulating coating 210 includes 1-8 wt % of pigment. The pigment may be selected to have a designated color, such as blue, yellow, or red color. The pigment is added to the insulating coating 210. When the insulating coating 210 is coated on the outer surface of the side wall 200, it is easy to distinguish one from another, so that the user can determine the coated area of the insulating coating 210 according to the color of the insulating coating 210.

In some embodiments, the pigment is selected from toners. For example, the toners include blue powder and titanium dioxide. The blue powder may be, for example, phthalocyanine blue powder. The ratio of the blue powder to the titanium dioxide is not limited here. For example, the ratio of the blue powder to the titanium dioxide is 1:10.

In other embodiments, pigment powders in the pigment have a particle size of less than or equal to 25 μm. This can prevent the too large particle size of the pigment powders from affecting the performance of the insulating coating 210.

The insulating film-forming resin may be configured in various ways. For example, the insulating film-forming resin is selected from epoxy resin, polyurethane resin, acrylic resin, phenolic resin, polyester resin, and combinations thereof. It can not only ensure that the insulating coating 210 has good insulation performance, but also can ensure that the insulating coating 210 has good adhesion, resistivity, etc.

The auxiliary agent may be configured in various ways. For example, the auxiliary agent is selected from at least one of a light stabilizer, a heat stabilizer, an antioxidant, a defoamer, a leveling agent, a flame retardant, and a plasticizer. This is beneficial to the curing and molding of the insulating coating 210 later.

The insulating coating 210 may be photo-cured or thermo-cured. For example, the insulating film-forming resin is obtained by photo-curing an acrylic functionalized prepolymer and an acrylic monomer in the presence of a photoinitiator, wherein the acrylic functionalized prepolymer is selected from at least one of a polyester acrylate prepolymer, epoxy acrylate prepolymer, urethane acrylate prepolymer and pure acrylate prepolymer, and the acrylic monomer is selected from at least one of monoalkyl acrylate, diol diacrylate and triol triacrylate.

Alternatively, in other embodiments, the insulating film-forming resin is obtained by curing reaction of epoxy resin, polyurethane, polyester or acrylic resin with a curing agent.

As an embodiment of the present application, when the insulating coating 210 is formed by photo-curing, the insulating coating 210 includes, for example, 5-8 wt % of pigment, 60-80 wt % of prepolymer, 10-30 wt % of monomer, 2-10 wt % of photoinitiator, and 1-3 wt % of auxiliary agent.

The prepolymer includes, for example, a polyester acrylate prepolymer, which has fast curing speed, high gloss and good adhesion; or the prepolymer includes an epoxy acrylate prepolymer, which has good chemical resistance, heat resistance, fullness and adhesion; or, the prepolymer includes a urethane acrylate prepolymer, which has the advantages of low energy, low shrinkage, good leveling, and improved toughness; or the prepolymer includes a pure acrylate prepolymer, which has the advantages of low viscosity and good leveling appearance.

The monomer is an organic small molecule including a polymerizable functional group, is easy to dissolve and dilute, and can adjust the viscosity of the system. The monomer includes, for example, alkyl acrylate, which has the characteristics of low viscosity, strong diluting ability, low photo-curing speed, low cross-linking density, low volume shrinkage, etc. Alternatively, the monomer includes dipropylene glycol diacrylate, which can effectively improve the adhesion of the insulating coating. Alternatively, the monomer includes trihydroxymethylpropane triacrylate, which has the characteristics of fast photo-curing speed, high cross-linking density, high film hardness and brittleness, good resistance, large molecular weight, high viscosity, etc.

After the photoinitiator absorbs light energy, it can jump to an excited singlet state, and then jump to an excited triplet state through intersystem crossing, and its molecular structure is unstable in the excited singlet or triplet state. The weak bond in the photoinitiator undergoes homolysis to generate active free radicals, which initiate the polymerization and cross-linking of oligomers and monomers. An absorption spectrum of the photoinitiator matches an emission spectrum of a light source. The photoinitiator may be, for example, an ITX photoinitiator or TPO photoinitiator suitable for colored systems. Alternatively, the photoinitiator is a 907 photoinitiator or 1173 photoinitiator which can be dried quickly.

The auxiliary agent may be, for example, a chain transfer agent, a light or heat stabilizer, a plasticizer, an oxygen inhibitor, or a free radical trapping agent.

As another embodiment of the present application, when the insulating coating 210 is formed by thermo-curing, the insulating coating 210 includes, for example, 2-3 wt % of pigment, 40-55 wt % of matrix resin, 30-50 wt % of curing agent, and 1-15 wt % of auxiliary agent.

The matrix resin may include, for example, epoxy resin, which has the characteristics of strong adhesion, strong mechanical properties, low curing shrinkage, good chemical stability, etc.

The curing agent may include, for example, phenolic resin, which has the characteristics of good wear resistance, high strength, good corrosion resistance, etc. The curing agent may also include dicyandiamide and the like.

The auxiliary agent may include, for example, a defoamer, a leveling agent, a flame retardant, a plasticizer, etc.

In order to ensure the overall insulation of the case 10, in some embodiments, the secondary battery further includes a second insulating film 220, which covers at least the non-coated region to ensure insulation of the non-coated region.

Figure 2:
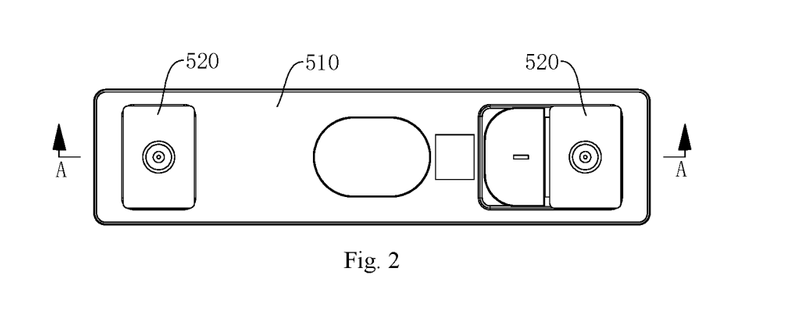
FIG. 2 is a top view of the secondary battery according to an embodiment of the first aspect of the present application.
Figure 3:
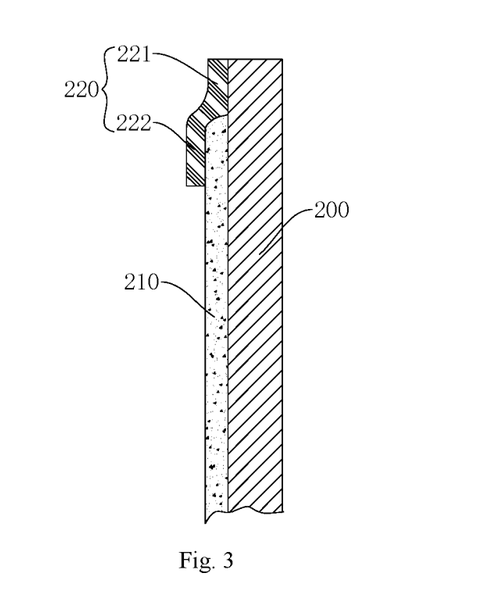
FIG. 3 is a partial cross-sectional view along A-A in FIG. 2.

Referring to FIG. 2 and FIG. 3 together, the second insulating film 220 may be configured in various ways. For example, the second insulating film 220 covers only the non-coated region. In other embodiments, the second insulating film 220 includes a bonding segment 221 and a stacking segment 222 successively arranged in the height direction, the bonding segment 221 is bonded to the non-coated region, and the stacking segment 222 extends from the bonding segment 221 to the outer surface of the insulating coating 210. In these embodiments, the second insulating film 220 and the insulating coating 210 can be stacked on each other through the stacking segment 222, which prevents a gap between the second insulating film 220 and the insulating coating 210 affecting the insulation performance of the outer surface of the case 10.

The stacking height of the second insulating film 220 and the insulating coating 210 is not limited, that is, the extension height of the stacking segment 222 in the height direction is not limited. Optionally, the stacking segment 222 has an extension height of from 1.5 mm to 6 mm in the height direction. Further, optionally, the stacking segment 222 has an extension height of from 3 mm to 5 mm in the height direction. When the extension height of the stacking segment 222 is within the above range, it can prevent a gap between the second insulating film 220 and the insulating coating 210 affecting the insulation performance of the outer surface of the case 10, and can also prevent waste of materials due to excessive extension height of the stacking segment 222.

In some embodiments, the second insulating film 220 has a thickness of from 100 μm to 120 μm. Optionally, the second insulating film 220 has a thickness of 110 μm. When the thickness of the second insulating film 220 is within the above numerical range, it can prevent the increase in the size of the secondary battery due to the too thick second insulating film 220, and can also ensure certain wear resistance of the second insulating film 220, prolong the service life of the second insulating film 220 and improve the insulation performance of the case 10.

In some embodiments, the second insulating film 220 and the first insulating film 510 are disposed integrally, which can improve the assembly efficiency of the secondary battery.

In some embodiments, the material of the second insulating film 220 is the same as that of the first insulating film 510, so details are not described herein again.

Figure 4:
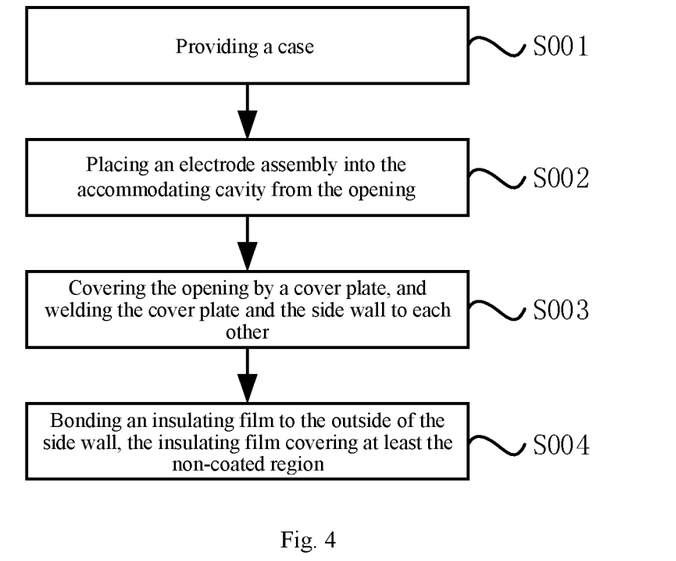
FIG. 4 is a schematic flowchart of a method for manufacturing a secondary battery according to an embodiment of the fifth aspect of the present application.

Referring to FIG. 4, the second aspect of the present application further provides a method for manufacturing a secondary battery, including:

Step S001: providing a case.

The case may be the case in any of the above embodiments.

Step S002: placing an electrode assembly into the accommodating cavity from the opening.

Step S003: covering the opening by a cover plate, and welding the cover plate and the side wall to each other.

Step S004: bonding an insulating film to the outside of the side wall, the insulating film covering at least the non-coated region.

In the method of the embodiment of the present application, before step S002 and step S003, that is, before the cover plate 500 and the case 10 are welded, the electrode assembly is placed and the cover plate 500 is closed, the insulating coating 210 is coated because the case at this time is relatively light and simple in structure, facilitating the application of the insulating coating 210. In step S003, the non-coated region can prevent the high temperature caused by welding from affecting the stability of the insulating coating 210. Through step S004, the insulation performance of the outer surface of the side wall 200 can be further improved, and safety accidents caused by electrification of the non-coated region can be prevented.

In some embodiments, step S001 includes:

Step S011: providing a case body.

Figure 5:
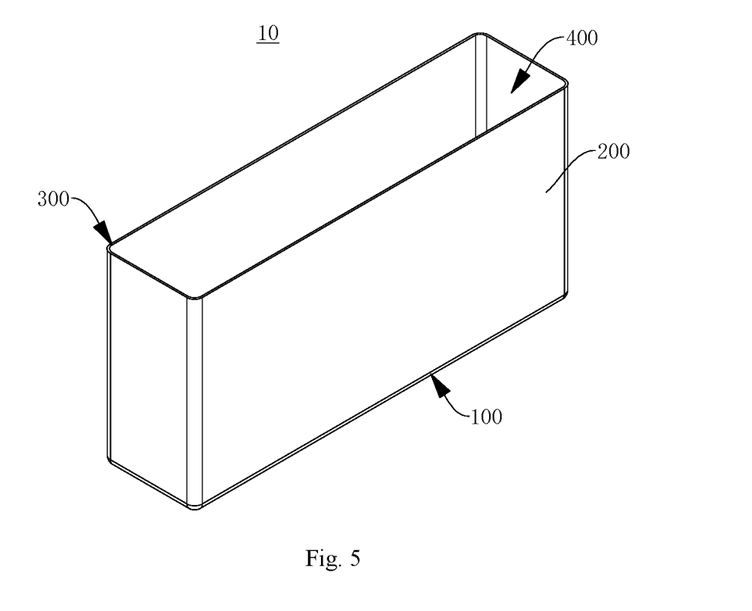
FIG. 5 is a schematic structural diagram of a case provided in the method for manufacturing a secondary battery according to an embodiment of the fifth aspect of the present application.

FIG. 5 shows a case body according to an embodiment of the present application. The case body includes a side wall 200, a bottom wall 100, an accommodating cavity 400, and an opening 300.

Step S012: cleaning the case body.

The cleaning method includes but is not limited to: ethanol cleaning, acetone cleaning, butanone cleaning, isoacetone cleaning, laser cleaning, plasma cleaning, etc. After cleaning, the case body includes a surface energy of greater than 36 N/m.

Figure 6:
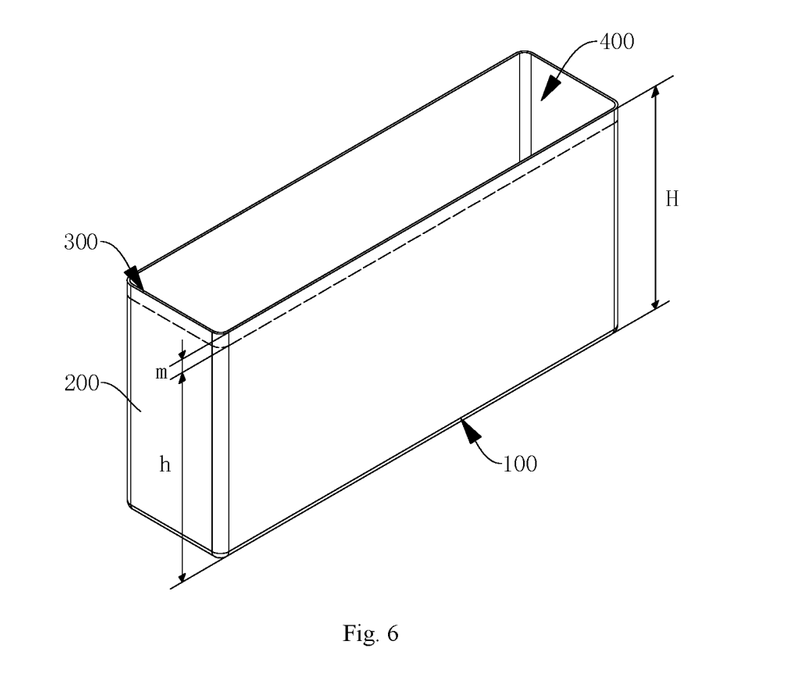
FIG. 6 is a schematic structural diagram of a case including a coated region and a non-coated region provided in the method for manufacturing a secondary battery according to an embodiment of the fifth aspect of the present application.

As shown in FIG. 6, after the case body is cleaned, the outer surface of the side wall 200 of the case body is divided into a coated region and a non-coated region. In order to highlight the coated region and the non-coated region, the boundary between the coated region and the non-coated region is shown by a dotted line in FIG. 6. It can be understood that the dotted line does not constitute a limitation on the structure of the case body. In FIG. 6, the portion with an extension size m in the height direction is the non-coated region, the portion with an extension size h in the height direction is the coated region, and the non-coated region is located on the side of the coated region that is close to the opening 300.

Figure 7:
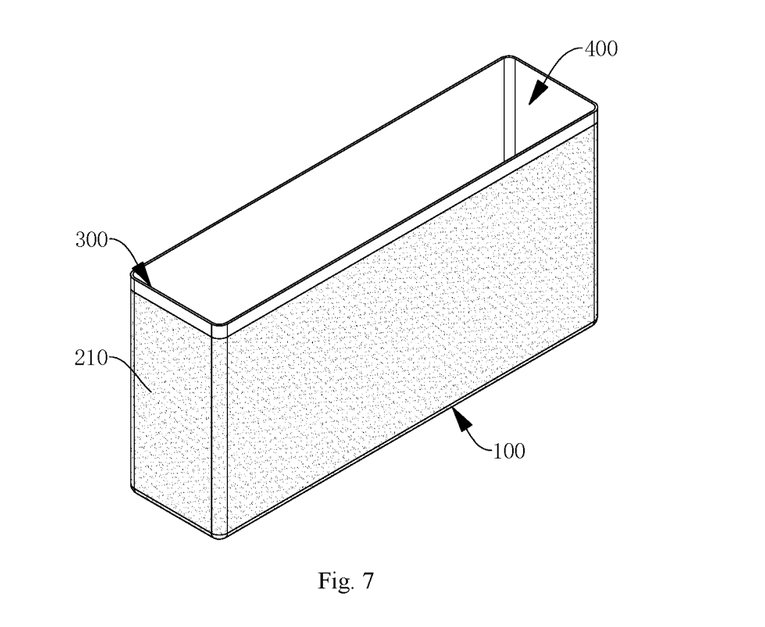
FIG. 7 is a schematic structural diagram of a case with an insulating coating provided in the method for manufacturing a secondary battery according to an embodiment of the fifth aspect of the present application.

Step S013: coating the coated region with the insulating coating 210 to form the case as described in any of the above embodiments.

As shown in FIG. 7, the coated region of the side wall 200 is coated with the insulating coating 210.

Figure 8:
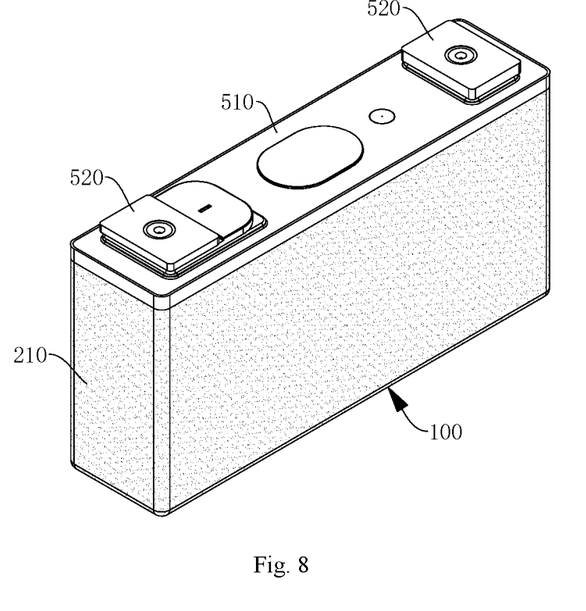
FIG. 8 is a schematic structural diagram of a secondary battery with a cover plate welded provided in the method for manufacturing a secondary battery according to an embodiment of the fifth aspect of the present application.

Then, the electrode assembly is placed in the case according to step S002. Next, as shown in FIG. 8, the opening 300 is covered by the cover plate 500 in step S003. Finally, the cover plate 500 and the side wall 200 are welded to each other in the non-coated region, the second insulating film 220 is bonded to the non-coated region of the side wall 200 so that the second insulating film 220 covers at least part of the insulating coating 210, and the first insulating film 510 is bonded to the top of the cover plate 500 to form the secondary battery described in any of the above embodiments.

The coated region is coated with the insulating coating by, but not limited to, an adhesive.

Those skilled in the art should understand that the above embodiments are all illustrative but not restrictive. Different technical features appearing in different embodiments can be combined to achieve beneficial effects. Those skilled in the art should be able to understand and implement other modified embodiments of the disclosed embodiments after studying the drawings, description, and claims. In the claims, the term "comprise" does not exclude other apparatuses or steps; when the term "a", "an" or "the" is used to describe an article, it is intended to include one or more articles, and can be used interchangeably with the term "one or more articles"; the terms "first" and "second" are used to denote names rather than to indicate any specific order. Any reference numerals in the claims should not be construed as limiting the scope of protection. The functions of multiple parts appearing in the claims may be implemented by a single hardware or software module. The appearance of certain technical features in different dependent claims does not mean that these technical features cannot be combined to achieve beneficial effects.

What is claimed is:

1. A method for manufacturing a secondary battery, comprising:
    providing a case comprising:
        a bottom wall and a side wall, the bottom wall and the side wall defining an accommodating cavity with an opening at one end for accommodating an electrode assembly of the secondary battery;
        wherein, an outer surface of the side wall comprises a coated region coated with an insulating coating, and the coated region extends, in a height direction of the side wall, from a side of the side wall that is close to the bottom wall to a position near an edge of a side of the side wall that is close to the opening, so as to reserve a non-coated region with a preset height on the outer surface of the side wall that is near an edge of the opening, and the coated region has an area of from 70% to 85%, relative to a total area of the outer surface of the side wall and the coated region has an extension height of from 70% to 85% in the height direction, relative to a total height of the side wall, and
        wherein the insulating coating comprises: relative to a total weight of the insulating coating, 80-97 wt % of insulating film-forming resin, 3-12 wt % of auxiliary agent, and 0-8 wt % of pigment,
        the case is a positively charged metal case;
    placing the electrode assembly into the accommodating cavity from the opening;
    covering the opening by a cover plate, and welding the cover plate and the side wall to each other; and
    bonding a second insulating film to the outside of the side wall, the second insulating film covering at least the non-coated region, the second insulating film comprises a bonding segment and a stacking segment successively arranged in the height direction, the bonding segment is bonded to the non-coated region, and the stacking segment extends from the bonding segment to an outer surface of the insulating coating, and wherein an outer surface of the cover plate away from the accommodating cavity is provided with a first insulating film, and the second insulating film and the first insulating film are disposed integrally, and the stacking segment has an extension height of from 1.5 mm to 6 mm in the height direction.

2. The secondary battery manufactured by the method according to claim 1, comprising:
    the case comprising:
        the bottom wall and the side wall, the bottom wall and the side wall defining the accommodating cavity with the opening at one end for accommodating the electrode assembly of the secondary battery;
        wherein, the outer surface of the side wall comprises the coated region coated with an insulating coating, and the coated region extends, in the height direction of the side wall, from the side of the side wall that is close to the bottom wall to the position near the edge of the side of the side wall that is close to the opening, so as to reserve the non-coated region with the preset height on the outer surface of the side wall that is near the edge of the opening, and the coated region has an area of from 70% to 85%, relative to a total area of the outer surface of the side wall and the coated region has an extension height of from 70% to 85% in the height direction, relative to a total height of the side wall, and
        wherein the insulating coating comprises: relative to the total weight of the insulating coating, 80-97 wt % of insulating film-forming resin, 3-12 wt % of auxiliary agent, and 0-8 wt % of pigment,
        the case is the positively charged metal case;
    the electrode assembly placed in the accommodating cavity;
    a cover plate covering the opening, wherein the outer surface of the cover plate away from the accommodating cavity is provided with the first insulating film, and the cover plate is provided with protruding structures, and the first insulating film is provided with through holes from which electrode terminals extend out; and
    a second insulating film covering at least the non-coated region, the second insulating film comprises the bonding segment and the stacking segment successively arranged in the height direction, the bonding segment is bonded to the non-coated region, and the stacking segment extends from the bonding segment to the outer surface of the insulating coating, and the stacking segment has an extension height of from 1.5 mm to 6 mm in the height direction.

3. The secondary battery according to claim 2, wherein the stacking segment has an extension height of from 3 mm to 5 mm in the height direction.

4. The secondary battery according to claim 2, wherein the insulating film has a thickness of from 100 μm to 120 μm.

5. The secondary battery according to claim 2, wherein the coated region has an area of 80%, relative to the total area of the outer surface of the side wall.

6. The secondary battery according to claim 2, wherein the non-coated region has an extension height of greater than or equal to 3 mm in the height direction.

7. The secondary battery according to claim 2, wherein pigment powders in the pigment have a particle size of less than or equal to 25 μm.

8. The secondary battery according to claim 2, wherein the pigment is selected from a toner;
and/or, the insulating film-forming resin is selected from epoxy resin, polyurethane resin, acrylic resin, phenolic resin, polyester resin, and combinations thereof;
and/or, the auxiliary agent is selected from at least one of a light stabilizer, a heat stabilizer, an antioxidant, a defoamer, a leveling agent, a flame retardant, and a plasticizer.

9. The secondary battery according to claim 2, wherein
the insulating film-forming resin is obtained by photo-curing an acrylic functionalized prepolymer and an acrylic monomer in the presence of a photoinitiator, wherein the acrylic functionalized prepolymer is selected from at least one of a polyester acrylate prepolymer, epoxy acrylate prepolymer, urethane acrylate prepolymer and pure acrylate prepolymer, and the acrylic monomer is selected from at least one of monoalkyl acrylate, diol diacrylate and triol triacrylate;
or, the insulating film-forming resin is obtained by curing reaction of epoxy resin, polyurethane, polyester or acrylic resin with a curing agent.

10. The secondary battery according to claim 2, wherein the insulating film-forming resin is obtained by photo-curing an acrylic functionalized prepolymer and an acrylic monomer in the presence of a photoinitiator, and the insulating coating comprises 5-8 wt % of the pigment, 60-80 wt % of the prepolymer, 10-30 wt % of the monomer, 2-10 wt % of the photoinitiator and 1-3 wt % of the auxiliary agent.

11. The secondary battery according to claim 2, wherein the insulating film-forming resin is obtained by curing reaction of the epoxy resin, the polyurethane, the polyester or the acrylic resin with the curing agent, and the insulating coating comprises 2-3 wt % of the pigment, 40-55 wt % of matrix resin, 30-50 wt % of the curing agent, and 1-15 wt % of the auxiliary agent.

12. The secondary battery according to claim 11, wherein the curing agent comprises at least one of phenolic resin and dicyandiamide.

13. The secondary battery according to claim 2, wherein the insulating coating has a thickness of from 80 μm to 160 μm.

14. The secondary battery according to claim 2, wherein the outer surface of the bottom wall away from the accommodating cavity is coated with the insulating coating.

15. The secondary battery according to claim 2, wherein the edge of the coated region that is close to the opening and the edge of the side wall that is close to the opening are disposed in parallel.

16. A battery pack, comprising:
a box; and
a plurality of secondary batteries according to claim 2 being accommodated in the box.

17. The battery pack according to claim 16, wherein the secondary batteries are adhered to an inner wall surface of the box by an adhesive.

18. A vehicle, comprising the battery pack according to claim 16.

19. The secondary battery manufactured by the method according to claim 1, comprising:
the case comprising:
the bottom wall and the side wall, the bottom wall and the side wall defining the accommodating cavity with the opening at one end for accommodating the electrode assembly of the secondary battery;
wherein, the outer surface of the side wall comprises the coated region coated with the insulating coating, and the coated region extends, in the height direction of the side wall, from the side of the side wall that is close to the bottom wall to the position near the edge of the side of the side wall that is close to the opening, so as to reserve the non-coated region with the preset height on the outer surface of the side wall that is near the edge of the opening and
wherein the insulating coating comprises: relative to the total weight of the insulating coating, 80-97 wt % of insulating film-forming resin, 3-12 wt % of auxiliary agent, and 0-8 wt % of pigment, and
wherein the case is made of a metal material and insulation protection is provided for the secondary battery to avoid an external short circuit of the secondary battery caused by electrically connecting the case of the secondary battery with a negative electrode,
the case is the positively charged metal case;
the electrode assembly placed in the accommodating cavity;
the cover plate covering the opening, wherein the outer surface of the cover plate away from the accommodating cavity is provided with the first insulating film; and
the second insulating film covering at least the non-coated region, the second insulating film comprises the bonding segment and the stacking segment successively arranged in the height direction, the bonding segment is bonded to the non-coated region, and the stacking segment extends from the bonding segment to the outer surface of the insulating coating.

20. The secondary battery manufactured by the method according to claim 1, comprising:
the case for the secondary battery, the case comprising the bottom wall and the side wall, the bottom wall and the side wall defining the accommodating cavity with the opening at one end for accommodating the electrode assembly of the secondary battery, and the case is the positively charged metal case;
the electrode assembly placed in the accommodating cavity;
the cover plate covering the opening; and
the second insulating film covering at least the non-coated region, the second insulating film comprises the bonding segment and the stacking segment successively arranged in the height direction, the bonding segment is bonded to the non-coated region, and the stacking segment extends from the bonding segment to the outer surface of the insulating coating,
wherein, the outer surface of the side wall comprises the coated region coated with the insulating coating, and the coated region extends, in the height direction of the side wall, from the side of the side wall that is close to the bottom wall to the position near the edge of the side of the side wall that is close to the opening, so as to reserve the non-coated region with the preset height on the outer surface of the side wall that is near the edge of the opening, and the insulating coating comprises: relative to the total weight of the insulating coating, 80-97 wt % of insulating film-forming resin, 3-12 wt % of auxiliary agent, and 0-8 wt % of pigment, and the second insulating film comprises the bonding segment and the stacking segment successively arranged in the height direction, and the stacking segment has the extension height of from 1.5 mm to 6 mm in the height direction, and wherein the outer surface of the cover plate away from the accommodating cavity is provided with the first insulating film, and the second insulating film and the first insulating film are disposed integrally.

* * * * *